(12) United States Patent
Barsness et al.

(10) Patent No.: US 7,901,288 B2
(45) Date of Patent: Mar. 8, 2011

(54) EMBEDDED ADVERTISING ENHANCEMENTS IN INTERACTIVE COMPUTER GAME ENVIRONMENTS

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 11/379,483

(22) Filed: Apr. 20, 2006

(65) Prior Publication Data

US 2007/0265090 A1 Nov. 15, 2007

(51) Int. Cl.
  *A63F 9/24* (2006.01)
  *A63F 13/00* (2006.01)
  *G06F 17/00* (2006.01)
  *G06F 19/00* (2006.01)
  *G06Q 30/00* (2006.01)

(52) U.S. Cl. ........................ 463/30; 705/14.4; 705/14.49

(58) Field of Classification Search ...................... 463/30
See application file for complete search history.

(56) References Cited

U.S. PATENT DOCUMENTS 6,231,347 B1 * 5/2001 Tsai .......................... 434/307 A
6,298,481 B1 * 10/2001 Kosaka et al. ................ 717/110
2003/0078972 A1 * 4/2003 Tapissier et al. .............. 709/204
2004/0148221 A1 * 7/2004 Chu ................................ 705/14
2004/0204238 A1 * 10/2004 Aoki ............................... 463/30

OTHER PUBLICATIONS

"Licensing opportunity: a technology that enables interactive, dynamic rich media format advertising into on-line video games,"http://www.cambridgenetwork.co.uk/pooled/articles/BF_NEWSTART/view.asp?Q=BF_NEWSTART_185497.
Kathy Prentice, "Your client's message in video games," http://medialifemagazine.com/artman/publish/article_2241.asp.
"Double Fusion Fun Media, Serious Results," http://www.doublefusion.com/faq.htm.

* cited by examiner

*Primary Examiner* — John M Hotaling
*Assistant Examiner* — Kevin Y Kim
(74) *Attorney, Agent, or Firm* — Wood, Herron & Evans, LLP

(57) ABSTRACT

Advertisements may be selected for display to a user in a computer game environment based at least in part on one or more of a personality trait of the user as determined from monitoring a behavior of the user as the user is participating in the computer game environment, a user affinity for a subject of another advertisement as determined from monitoring activity of the user after the user views the other advertisement while the other advertisement is displayed in the computer game environment, and a characteristic of the user as determined from a username selected by the user.

36 Claims, 4 Drawing Sheets

EMBEDDED ADVERTISING ENHANCEMENTS IN INTERACTIVE COMPUTER GAME ENVIRONMENTS

FIELD OF THE INVENTION

The invention relates to computers and computer software, and in particular, to the selection and display of advertisements in computer game environments.

BACKGROUND OF THE INVENTION

Due in part to the increasing use of Digital Video Recorders (DVR's) and other commercial skipping technologies, advertisers are increasingly looking to alternative mechanisms for presenting advertisements to consumers. For example, many advertisers are increasingly relying upon embedded advertisements and product placements within television shows and movies. Likewise, interactive environments such as computer games are emerging as viable media for reaching consumers, and as a result, computer games often incorporate advertisements both within an without the computer game environment.

Many computer games provide interactive environments within which users take on the role of a character in the environment, and interact with other characters and objects displayed in the environment. While some computer games are purely stand-alone games, whereby all of the other characters and objects are computer-controlled, many computer games permit multiple users to assume the roles of different characters and interact with one another in the computer game environment. Massively Multiplayer Online Games (MMOG's), in fact, permit hundreds or thousands of users to interact with one another in the same computer environment.

Particularly given the increased realism of many computer game environments, the advertisements and product placements that may be envisioned within a computer game environment are as unlimited as may be envisioned in the real world. For example, some computer games allow a user to play as a character that is associated with a particular product or brand. Other computer games display billboards as might be displayed on a building or along a highway, or anywhere else where an advertisement might be found in the real world. Still other computer games provide product placement for particular products within the computer game environment, e.g., by displaying a soda machine for a particular brand of beverage.

In many instances, advertisements displayed within a computer game environment may be superior to advertisements in television shows, movies, and other scripted material given that there is often a greater potential to make a stronger impression on a computer game user. Whereas an advertisement or product placement in a television show or movie may be displayed for a few seconds in a particular scene, an advertisement displayed in a computer game environment may be displayed for a longer period of time, and a user, if interested, can often move or otherwise orient his or her display to view the advertisement in more detail. In addition, in many interactive environments, a user can actually interact with the advertisement in the course of playing a game.

Advertisers are also increasingly attempting to target and tailor advertisements to reach specific consumers. In many instances, the ability to target advertisements in movies and television shows is limited given that such content is typically viewed by large numbers of individuals. Computer games, likewise, may be purchased and played by large numbers of individuals, and as a result, the advertisements displayed by such computer games may not be particularly well targeted.

In many computer games, advertisements are hard coded into the game, and thus are incapable of being changed once a game is released. Other computer games, however, support the ability to dynamically place advertisements within a computer game environment. For example, platforms have been developed to enable computer game developers to specify locations in a game where advertisements will appear. Then, while a user is playing the game, different advertisements are dynamically inserted into the specified locations. Some platforms, for example, enable a computer game to access a central server and retrieve advertisements, thus enabling the advertisements that are downloaded to a computer game to be changed over time. Furthermore, some platforms track a user's interaction with an advertisement, e.g., to determine how long a user viewed a particular advertisement and whether the user performed an action associated with the advertisement. Such information may then be forwarded to a central computer and collected with similar information from other users for use by advertisers in determining the effectiveness of a particular advertisement or advertising campaign.

While dynamic placement of advertisements provides significantly greater flexibility for advertisers in reaching consumers interacting in a computer game environment, existing systems still provide only a limited ability to target advertisements toward particular types of consumers. A significant need therefore still exists for improved manners of targeting advertisements to users in computer game environments.

SUMMARY OF THE INVENTION

The invention addresses these and other problems associated with the prior art by providing in one aspect an apparatus, program product, service and method of generating an advertisement in a computer game environment that select advertisements based at least in part on monitored activity of a user interacting within the computer game environment.

For example, in some embodiments of the invention, an advertisement to be displayed to a user in a computer game environment may be selected based upon a personality trait of the user as determined from monitoring a behavior of the user as the user is participating in the computer game environment. In some embodiments, for example, a user's behavior in connection with interacting with other characters or objects may be monitored to detect positive or negative actions undertaken by the user, such that a personality trait of the user can be predicted and used in the selection of an advertisement to be displayed to that user.

In other embodiments of the invention, an advertisement to be displayed to a user in a computer game environment may be selected based upon a user affinity for a subject of another advertisement as determined from monitoring activity of the user after the user views the other advertisement while the other advertisement is displayed in the computer game environment. In some embodiments, for example, a user's interaction with one advertisement may be monitored to detect positive or negative actions undertaken by the user, such that the user's affinity for the advertisement, or the product or product type that is associated with the advertisement, can be predicted and used in the selection of subsequent advertisements to be displayed to that user. In addition, a user's communications conducted after viewing the advertisement, e.g., text messages sent from the user to another user in the environment, may be monitored to detect user affinity for a particular product.

The invention addresses additional problems associated with the prior art by providing in another aspect an apparatus, program product, service and method of generating an advertisement in a computer game environment that selects advertisements to be displayed to a user when the user is interacting with the computer game environment based upon a characteristic of the user as determined from a username selected by the user. For example, in some embodiments, the user's gender can be ascertained from the selection of a gender-specific username. In still other embodiments, the user's affinity for a particular artistic work or genre may be ascertained from the selection of a particular username, providing insight into the possible likes or dislikes of that user for the purposes of targeting advertisements to that user.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
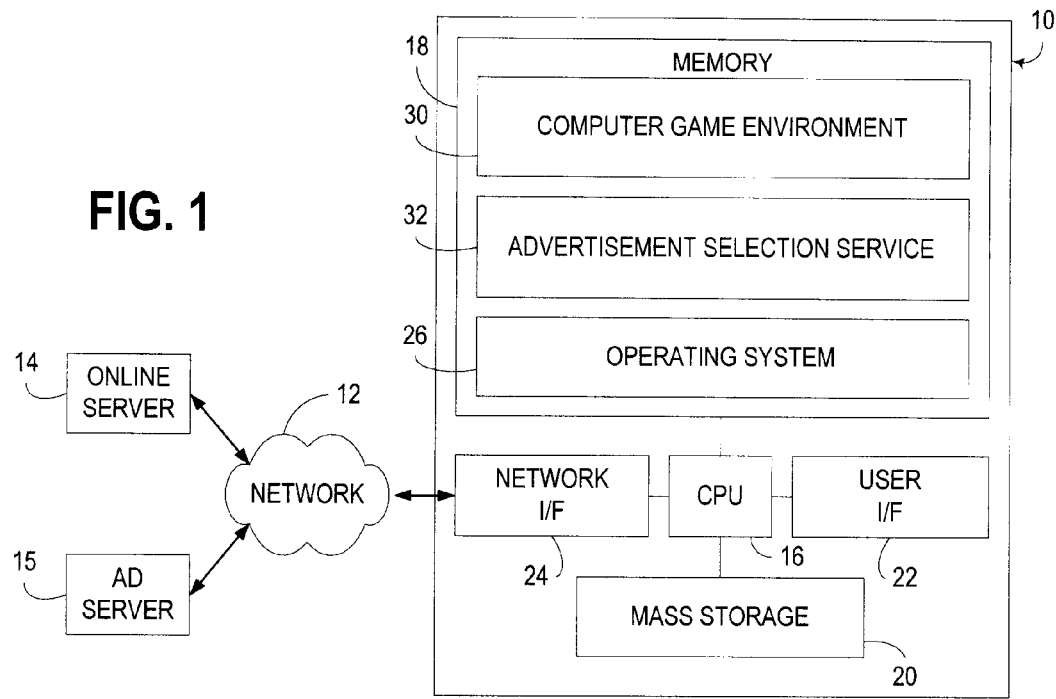
FIG. 1 is a block diagram of the principal hardware components in a computer system suitable for implementing an advertisement selection service consistent with the invention.

The embodiments discussed hereinafter improve the targeting of advertisements in a computer game environment based upon the input of a user of the computer game environment. An advertisement, in this regard, may be considered to be any presentation of content to a user for the purpose of advertising a product or service. An advertisement may include text, graphics, animation, video and/or audio, or practically any other form of electronic content. Furthermore, an advertisement may constitute a product placement where a product to be advertised is displayed in the computer game environment, and optionally additionally capable of being interacted with or otherwise manipulated by a user. An advertisement may also be a virtual representation of a real world advertisement in the computer game environment, e.g., a billboard, store signage, a newspaper advertisement, a television advertisement, a radio advertisement, an advertisement on a computer screen displayed in a computer game environment, etc.

An advertisement may be associated with a subject, which is typically a product or service, or relatedly, a particular brand or provider of a product or service. The implementations discussed below generally focus on advertisements that are specifically associated with products; however, it will be appreciated that any reference to a product herein may also be considered to apply to a service or other suitable subject for an advertisement.

The selection of advertisements as described herein may utilize a number of techniques. For example, in some embodiments of the invention, an advertisement to be displayed to a user in a computer game environment may be selected based upon a personality trait of the user as determined from monitoring a behavior of the user as the user is participating in the computer game environment. As an example, consider two users playing the same computer game, e.g., a strategic life simulator. One user plays the game by having his or her character live a "normal" life, obeying laws and generally being good to other characters. The other user's character is a cheat and a thief. Through monitoring the behavior of each user, the former user may be deemed to have a "nice" personality trait, and as a result, may be targeted for advertisements appropriate for such a person. In contrast, the latter user may be deemed to have a "mean" personality trait, and as a result, may be targeted for advertisements appropriate for such a person.

Likewise, in a first person shooter game, behavior monitoring may be used to distinguish, for example, between an individual who judiciously attempts to protect and avoid civilians and bystanders from one who goes around shooting everything in sight.

In other embodiments of the invention, an advertisement to be displayed to a user in a computer game environment may be selected based upon a user affinity for a subject of another advertisement as determined from monitoring activity of the user after the user views the other advertisement while the other advertisement is displayed in the computer game environment. For example, in a first person shooter game, monitoring of a user's interaction with a billboard displaying an advertisement for a certain product may identify a user having a high or low affinity for the product. If the user chooses to shoot or punch the billboard, the monitoring may determine a low affinity. Otherwise, if the user walks closer to the billboard, walks around other objects to get closer or get a clearer view of the billboard, or stops "scanning" the horizon to focus on a billboard, the monitoring may determine a high affinity. Furthermore, interactions with products or objects associated with products may be monitored to determine user affinity, e.g., to detect a user shooting or blowing up a vending machine, or to detect a user walking to get closer to a particular brand of automobile displayed in the environment.

In addition, such monitoring may incorporate monitoring the communications of a user after viewing an advertisement. As an example, many computer game environments permit users to communicate audibly and/or send text messages to each other within the game. By monitoring such communications, high or low user affinity for a particular advertisement or product or product type associated with the advertisement may often be ascertained.

In other embodiments, an advertisement to be displayed to a user when the user is interacting with the computer game environment may be selected based upon a characteristic of the user as determined from a username selected by the user. For example, in some embodiments, the user's gender can be ascertained from the selection of a gender-specific username. In still other embodiments, the user's affinity for a particular artistic work or genre may be ascertained from the selection of a particular username, providing insight into the possible likes or dislikes of that user for the purposes of targeting advertisements to that user. In the latter instance, in many cases users will select usernames from movies or books for which they have an affinity. Thus, for example, if a user selects a username based upon a character from the *Lord of the Rings* series, advertisements may be selected on the assumption that the user likes the Tolkien series, as well as the fantasy genre.

It will be appreciated that the advertisement selection services described herein may be utilized in a wide variety of computer game environments. In this regard, a computer game environment may be considered to correspond to any interactive environment created in a computer, a game console, a handheld game, etc., and within which a user plays a game. A computer game environment is typically a virtual environment within which a user interacts, with the user typically taking the role of a character in that environment. The environment may be a single player or stand-alone environment, within which the user participates alone, or may be a multiplayer or online environment within which multiple users participate. Such users may be accessing the same computer, different computers networked via a private network and/or different computers networked via the Internet or another public network. A computer game environment may be disposed solely within a single computer, or may be distributed among multiple computers, and as such, the invention is not limited to any particular implementation of computer game environment.

One exemplary environment within which an advertisement selection service consistent with the invention may be implemented is an online strategic life simulator where users control characters that "live" in a virtual world. In this game players can do just about anything, which could include walking the city streets and seeing virtual billboards, having their character go to a movie or watch TV in which commercials would air, or having them read a virtual newspaper with ads in it. Another exemplary environment is first person shooter game, where a user walks around a virtual world and blows things up. In some of these virtual worlds there are cityscapes complete with billboards where ads are displayed and where objects are disposed throughout the environment, providing the possibility for product placements throughout the environment. Other environments, e.g., gambling games, card games, driving games, arcade games, sports games, role-playing games, war/history simulations, educational games, strategy games, etc. may also utilize the various techniques described herein.

Turning now to the Drawings, wherein like numbers denote like parts throughout the several views, FIG. 1 illustrates an apparatus 10 within which an advertisement selection service consistent with the invention may be implemented. Apparatus 10 in the illustrated embodiment is implemented as a device such as a single user computer or a game console that is coupled via a network 12 to one or more servers, e.g, an online game server 14 and an ad server 15. For the purposes of the invention, each device 10, 14, 15 may represent practically any type of computer, computer system or other programmable electronic device, e.g., a handheld game, a mobile phone, a PDA, a game console, etc. Moreover, each device 10, 14, 15 may be implemented using one or more networked computers, e.g., in a cluster or other distributed computing system. In the alternative, device 10 may be fully implemented within a single computer or other programmable electronic device, and may lack network connectivity.

Apparatus 10 typically includes a central processing unit 16 including at least one microprocessor coupled to a memory 18, which may represent the random access memory (RAM) devices comprising the main storage of apparatus 10, as well as any supplemental levels of memory, e.g., cache memories, non-volatile or backup memories (e.g., programmable or flash memories), read-only memories, etc. In addition, memory 18 may be considered to include memory storage physically located elsewhere in apparatus 10, e.g., any cache memory in a processor in CPU 16, as well as any storage capacity used as a virtual memory, e.g., as stored on a mass storage device 20 or on another device coupled to apparatus 10. Apparatus 10 also typically receives a number of inputs and outputs for communicating information externally. For interface with a user or operator, apparatus 10 typically includes a user interface 22 incorporating one or more user input devices (e.g., a keyboard, a mouse, a game controller, a trackball, a joystick, a touchpad, and/or a microphone, among others) and a display (e.g., a CRT monitor, an LCD display panel, and/or a speaker, among others). Otherwise, user input may be received via another computer or terminal. In the case of a game console implementation of apparatus 10, the display of information to a user may be performed by an external television or similar display.

For additional storage, apparatus 10 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, apparatus 10 may include an interface 24 with one or more networks 12 (e.g., a LAN, a WAN, a wireless network, and/or the Internet, among others) to permit the communication of information with other computers and electronic devices. It should be appreciated that apparatus 10 typically includes suitable analog and/or digital interfaces between CPU 16 and each of components 18, 20, 22 and 24 as is well known in the art. Other hardware environments are contemplated within the context of the invention.

Apparatus 10 operates under the control of an operating system 26 and executes or otherwise relies upon various computer software applications, components, programs, objects, modules, data structures, etc., e.g., one or more computer game environments 30. Moreover, various applications, components, programs, objects, modules, etc. may also execute on one or more processors in another device coupled to apparatus 10 via network 12, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code", or simply "program code". Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

To implement advertisement selection consistent with the invention, apparatus 10 includes an advertisement selection service 32 that is utilized in connection with computer game environment 30 to both monitor user activity in environment 30 and to select advertisements to be displayed in environment 30. Service 32 may be implemented, for example, as a library or framework, or alternatively as a middleware-type service, which can interact with environment 30. In other embodiments, service 32 may be implemented directly within environment 30.

In the implementation illustrated in FIG. 1, computer game environment 30 may be implemented as a client for an online game, e.g., as supported by an online game server 14. Furthermore, advertisement selection service 32 may be configured to access an ad server 15 to retrieve ads based upon a particular profile developed for a user of the computer game environment. In other implementations, however, environment 30 may be a stand-alone game, and may not access an online server. Similarly, in some implementations, available advertisements may be resident in service 32, whereby no separate access to an ad server 15 may be required. In still other implementations, servers 14 and 15 may be combined.

As will become more apparent below, the principal functions of advertisement selection service 32 may be partitioned into three principle components. A user monitor component may be used to monitor user activity in the computer game environment, while an analysis engine component may be used to analyze the monitored activity of a user to identify characteristics, traits and/or affinities for a user with respect to particular products, product types, etc. An advertisement selection engine component may be used to select advertisements based at least in part upon the analysis provided by the analysis engine component. It will be appreciated that different numbers of components may be used to implement an advertisement selection service consistent with the invention, and that the monitoring, analysis and/or selection functions may be combined or partitioned in other manners.

Figure 2:
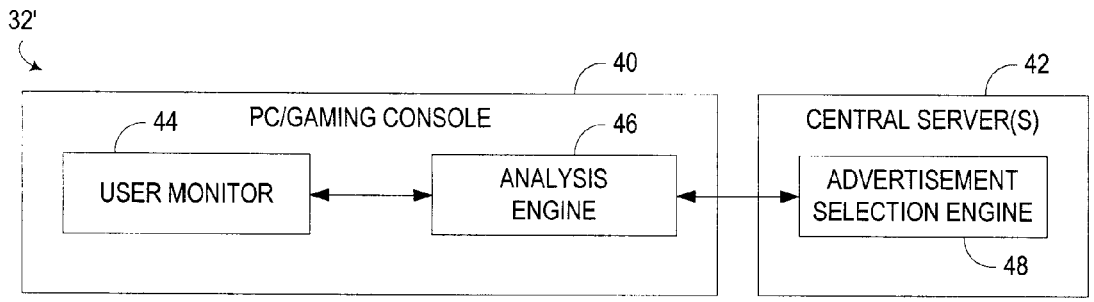
FIG. 2 is a block diagram of one alternative distributed architecture for implementing an advertisement selection service consistent with the invention.
Figure 3:
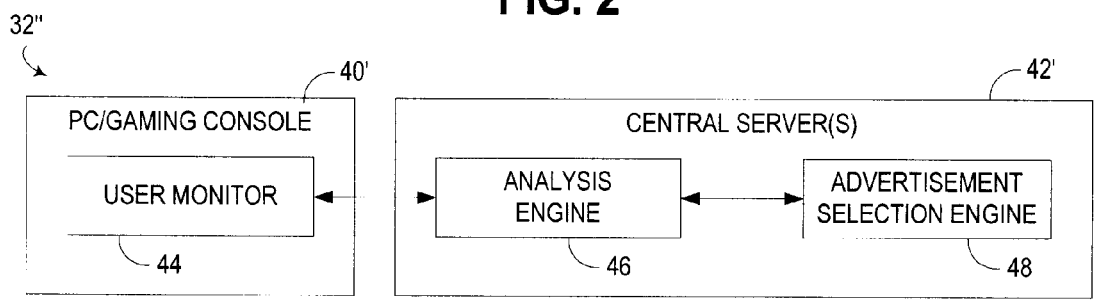
FIG. 3 is a block diagram of another alternative distributed architecture for implementing an advertisement selection service consistent with the invention.

In the illustrated implementation of FIG. 1, all three components of service 32 are implemented locally in apparatus 10. In other embodiments, however, the components of service 32 may be implemented in one or more central servers. In addition, as illustrated in FIGS. 2 and 3, in some implementations the different components of an advertisement selection service may be distributed among multiple entities. FIG. 2, for example, illustrates a service 32' where a personal computer or game console 40 is interfaced with one or more central servers 42, with a user monitor component 44 and an analysis engine component 46 resident in the personal computer or game console 40, and an advertisement selection engine 48 resident in central server(s) 42. On the other hand, FIG. 3 illustrates a service 32" where a personal computer or game console 40' is interfaced with one or more central servers 42', with user monitor component 44 resident in the personal computer or game console 40', and the analysis and advertisement selection engines 46, 48 resident in central server(s) 42'. Practically any other partitioning of functionality between various devices in a computer system may be used consistent with the invention.

Those skilled in the art will recognize that the exemplary environments illustrated in FIGS. 1-3 are not intended to limit the present invention. Indeed, those skilled in the art will recognize that other alternative hardware and/or software environments may be used without departing from the scope of the invention.

Figure 4:
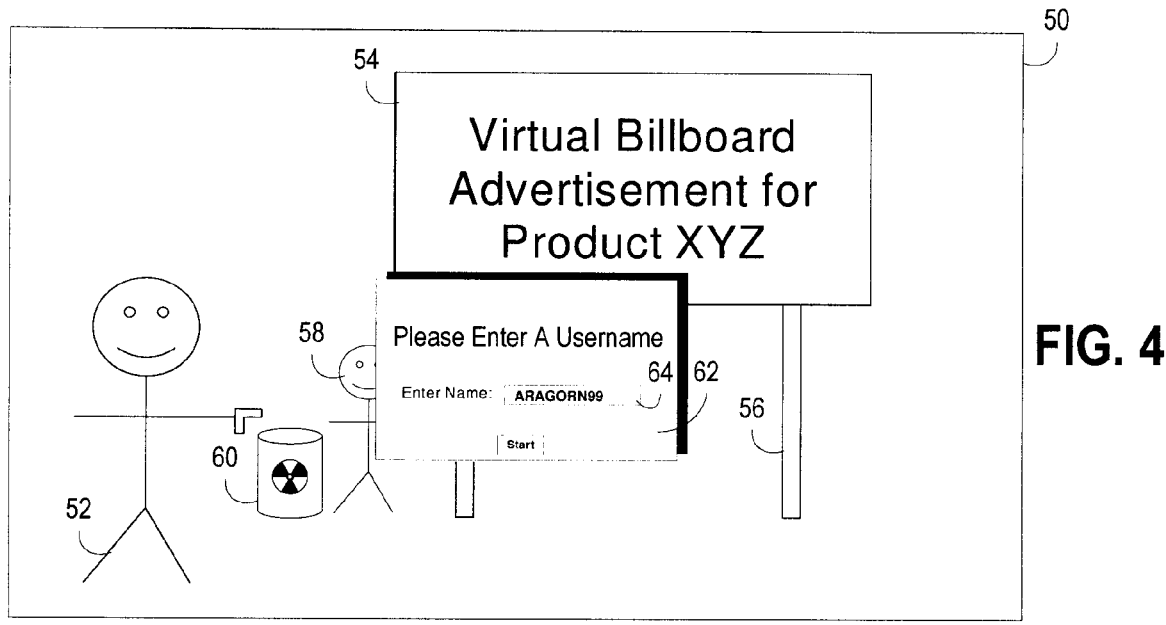
FIG. 4 is a block diagram of an exemplary display for a computer game environment incorporating an advertisement selection service consistent with the invention.

FIG. 4 illustrates an exemplary display 50 for a computer game environment incorporating an advertisement selection service consistent with the invention, and used to facilitate an understanding of the various functions of the advertisement selection service described below. Display 50 illustrates a user-controlled character 52, as well as an advertisement 54 displayed at a location 56 (or ad placement opportunity) in the computer game environment. As is also illustrated in FIG. 4, the computer game environment may also include one or more other characters 58, which may be computer-controlled and/or controlled by other users, as well as one or more objects 60. FIG. 4 also illustrates a dialog box 62 that may be displayed prior to initiation of game play by a user to enable a user to input a username, e.g., as illustrated at 64. It will be appreciated that the display illustrated in FIG. 4 is merely exemplary in nature, and that the invention is not limited to any of the particular display configurations illustrated therein.

Figure 5:
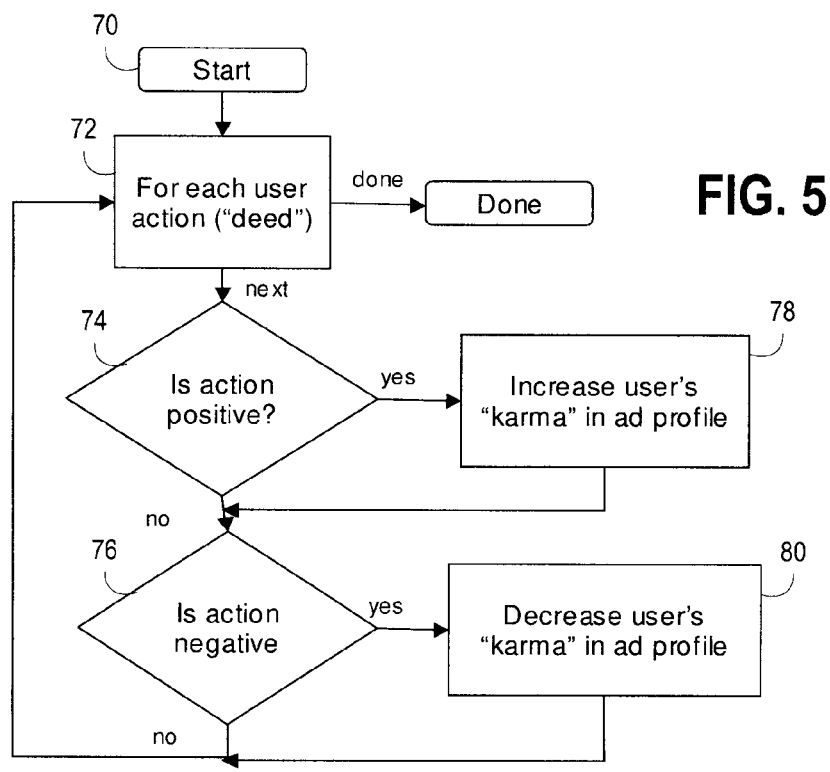
FIG. 5 is a flowchart illustrating the program flow of a user personality trait analysis routine capable of being executed by the advertisement selection service referenced in FIG. 1.

As noted above, one function supported by an advertisement selection service consistent with the invention is that of monitoring the behavior of a user and determining therefrom a personality trait for the user that is used at least in part in the selection of advertisements to display to that user. FIG. 5, for example, illustrates a flowchart of a user personality trait analysis routine 70 capable of being executed by advertisement selection service 32 of FIG. 1.

In routine 70, as well as the other routines discussed hereinafter, it is assumed that, for each user for which advertisements are selected, an ad profile is created for that user and is used in the selection of advertisements to be presented to that user. In this regard, an ad profile for the user may be implemented using any suitable data structure. Moreover, the ad profile for a user may be stored locally in the personal computer or game console used by that user, or alternatively, may be stored at a central location. Moreover, it will be appreciated that the user's ad profile may be based upon a single game, or alternatively, may be compiled based upon the monitoring of user activity in association with multiple games. It will also be appreciated that the use and access to a user's ad profile may be restricted as desired to address user privacy concerns.

Routine 70 begins in block 72 by monitoring user actions in connection with the playing of a game in the computer game environment. For each such action, routine 70 determines whether the action is "positive" in nature (block 74) and/or "negative" in nature (block 76). If an action is determined to be "positive", block 74 passes control to block 78 to increase a user's "karma" in an ad profile established for the user. Likewise, if the user's action is determined to be "negative" in nature, block 76 passes control to block 80 to decrease that user's "karma" in the ad profile for that user. If an action is determined to neither be "positive" nor "negative", no update is required for the user's ad profile.

As noted above, routine 70 is based upon the concept of an ad profile established for each user. The profile may be implemented using any suitable data structure, and in this implementation, tracks a personality trait of the user related to how "good" or "bad" (or alternatively, how "nice" or "mean") the user is in connection with interacting in the computer game environment. The user's personality trait is thus encoded in a "karma" variable representing how "good"/"nice" the user is when interacting in the computer game environment. In this regard, the "karma" variable functions as a personality score for the user. As such, when advertisements are selected for this user, advertisements that match the profile of a "good" or a "bad" user may be appropriately selected for the given user (e.g., to distinguish nice, introverted individuals from nice, outgoing individuals).

The types of actions that may be monitored in routine 70 may vary in different embodiments. For example, the behavior of a user may be monitored to detect, among other actions, actions indicative of ethical conduct, unethical conduct, passive conduct, aggressive conduct, friendly conduct, unfriendly conduct, serious conduct, unserious conduct, generous conduct, selfish conduct, respectful conduct, rude conduct, deceitful conduct, honest conduct, creative conduct, shy conduct, bold conduct, helpful conduct, curious conduct, cooperative conduct, etc. In addition, rather than computing a personality score for a user that grades the user along a scale between "good" and "bad", it will be appreciated that different personality traits may be collected for a given user to further quantify the behavior of that user, and facilitate the selection of more targeted advertisements for that user (e.g., to distinguish nice, introverted individuals from nice, outgoing individuals). Any number of character or personality traits may be collected for a user, e.g., various traits such as absent-minded, ambitious, awkward, boastful, bossy, brave, calm, careless, care-free, cautious, changeable, charming, clever, confused, contented, cooperative, courageous, cowardly, cruel, hard-working, curious, daring, demanding, dependable, determined, dreamy, dull, fearful, fierce, forgetful, forgiving, friendly, fussy, generous, gentle, gloomy, greedy, helpful, honest, intelligent, jolly, kind, lazy, loud, loyal, mischievous, nagging, neat, obedient, organized, outspoken, patient, playful, pleasant, polite, quarrelsome, quick-tempered, quiet, reasonable, reckless, relaxed, restless, rude, self-centered, selfish, sensitive, sentimental, serious, sharp-witted, shiftless, shrewd, shy, sneaky, soft-hearted, spunky, stern, stingy, stubborn, superstitious, suspicious, talkative, timid, tough, trusting, understanding, unfriendly, unkind, wise, withdrawn, witty, zany, etc.

In addition, the actions monitored for a user may be based upon interaction of the user with other characters, including characters controlled by other users, and/or the user's interaction with objects within the computer game environment. For example, as shown in FIG. 4, a "negative" action might be detected when monitoring the behavior of the user controlling character 52 if the user chooses to shoot an innocent bystander such as character 58, or to blow up character 58 by shooting an object such as barrel 60.

Furthermore, while the analysis of the behavior of the user in routine 70 predominantly consists of increasing or decreasing a personality score for the user based upon the detection of "positive" or "negative" actions, it will be appreciated that in other embodiments, the analysis can incorporate more sophisticated determination of personality traits based upon a data set of user behavior in connection with a user's interaction with various types of objects and/or characters. Other variations will be apparent to one of ordinary skill in the art having the benefit of the instant disclosure.

Figure 6:
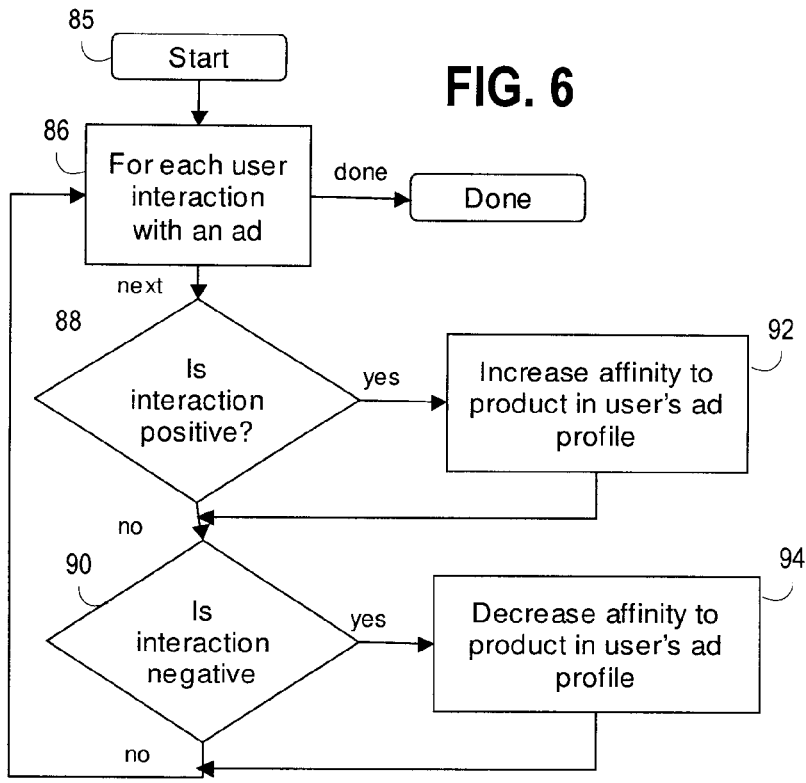
FIG. 6 is a flowchart illustrating the program flow of a user affinity analysis routine capable of being executed by the advertisement selection service referenced in FIG. 1.

As noted above, an advertisement selection service consistent with the invention may also determine a user affinity between a user and a particular advertisement and/or product/service or product/service type associated with an advertisement, based upon the activity of a user after viewing a particular advertisement. In some implementations, the activity of the user that is monitored may be the interaction of the user with the advertisement itself. FIG. 6, for example, illustrates a user affinity analysis routine 85 capable of being executed by the advertisement selection service 32 of FIG. 1.

Routine 85 begins in block 86 by processing each user interaction with a particular advertisement displayed to the user in a computer game environment. Blocks 88 and 90 respectively detect whether a given interaction is "positive" or "negative". If an interaction is "positive", block 88 passes control to block 92 to increase the user affinity for the product associated with the advertisement in the user's ad profile. Likewise, if the interaction is "negative", block 90 passes control to block 94 to decrease the user's affinity to the product in the user's ad profile. If the interaction is neither "positive" nor "negative", the affinity is not altered.

Of note, the user interaction with an advertisement, and its resulting effect on the user's affinity to the product associated with that advertisement, does not generally affect selection of the advertisement being interacted with. Instead, the determined user affinity for a particular advertisement or product will typically affect the selection of future advertisements, e.g., future advertisement displayed at the same location, or alternatively, future advertisements displayed in other locations. As a result, for example, if a user is determined to have interacted with the advertisement in a "negative" fashion, a low user affinity will be determined for the subject of that advertisement, such that selection of another advertisement will typically result in the selection of an advertisement that is dissimilar in nature to the subject of the advertisement with which the user has interacted. The dissimilar subject may be, for example, a different brand of the same product or service as that for the advertisement with which the user has interacted, or alternatively, a subject may be dissimilar in that an advertisement may be selected for a completely different product type or category. Likewise, in response to the detection of "positive" actions directed to an advertisement by a user, typically a high user affinity will be determined, resulting in future advertisements being selected for subjects that are similar to that of the advertisement with which the user has interacted. Such similarity may include the display of different advertisements for the same product, as well as repeating the same advertisement at a later time and/or in a different location.

The types of interactions that may be detected may vary in different embodiments. For example, as illustrated in FIG. 4, a "negative" interaction may be detected in response to the user controlling character 52 shooting advertisement 54, and as a result, may indicate a low user affinity for that user with the advertisement, for a product XYZ that is the subject of the advertisement, or even for the product type or category for product XYZ. In contrast, a "positive" interaction may be detected, for example, if the user controlling character 52 pauses to look at advertisement 54 for an extended period of time. It will be appreciated that a wide variety of interactions, both "positive" and negative in nature, may be envisioned depending upon the type of computer game environment, advertisement, product, etc. Moreover, it will be appreciated that a user affinity may be represented in a number of manners in an ad profile, e.g., via scores associated with specific products, brands, product categories, etc. Other variations will be apparent to one of ordinary skill in the art.

Figure 7:
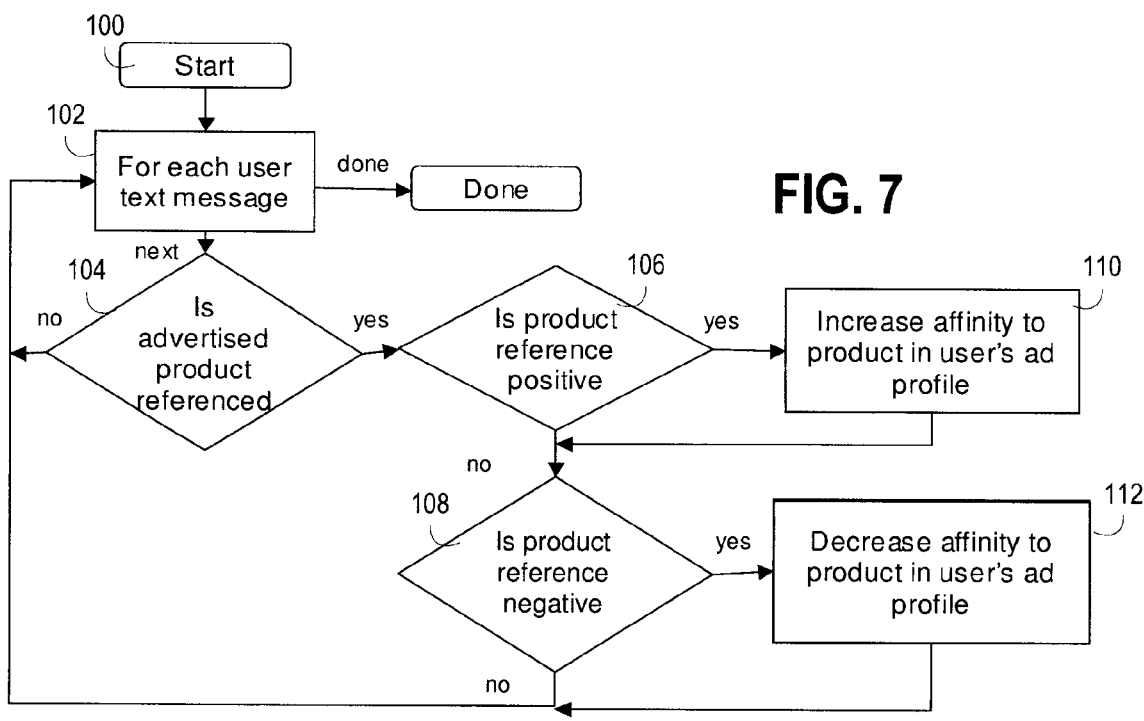
FIG. 7 is a flowchart illustrating the program flow of a text message affinity analysis routine capable of being executed by the advertisement selection service referenced in FIG. 1.

Another type of user activity that may be used to determined a particular user affinity between a user and the subject of an advertisement may be based upon communications between a user and another user of a computer game environment after the user is presented with a particular advertisement. FIG. 7, for example, illustrates a text message affinity analysis routine 100 capable of being executed by advertisement selection service 32 of FIG. 1, which searches text messages communicated between users in a computer game environment to identify "positive" or "negative" references to the subjects of advertisements being presented to a user.

Routine 100 begins in block 102 by processing each user text message. For each such message, block 104 determines whether a reference is present in the text message to an advertised product or other subject. If not, no further activity is performed with respect to the text message. Otherwise, control passes to blocks 106 and 108 to respectively determine whether a reference to an advertised product is "positive" or "negative". If a "positive" product reference is detected, block 106 passes control to block 110 to increase the user's affinity to the product in the user's ad profile. Similarly, in response to the detection of a "negative" interaction, block 108 passes control to block 112 to decrease the user's affinity to the product in the user's ad profile.

Detection of a product reference may vary in different embodiments. For example, a product reference may require identification of a reference to the name of the product in a text message, or may additional look for references to the advertisement itself, or pronouns that can be attributed back to the product or the advertisement. Furthermore, the identification of "positive" or "negative" references may be based upon detecting any number of keywords associated with "positive" or "negative" impressions of a subject. For example, a text message that is sent after a user views a video clip advertisement might be detected as a "positive" reference if the text message stated "that was really cool", while a text message might be determined to be a "negative" reference if the message included keywords such as "boring", "stupid", "lame". It will be appreciated that any number of suitable text analysis technologies may be utilized to determine "positive" and "negative" references to an advertised product consistent with the invention. It will also be appreciated that an advertisement selection service consistent with the invention may monitor other types of messages, e.g., voice messages, or conversations between users interacting in a computer game environment. Other modifications will be apparent to one of ordinary skill in the art.

Yet another type of user input that may be monitored and utilized in connection with the selection of advertisements is based upon a username selected by a user of a computer game environment. As shown in FIG. 4, for example, a user may be presented with a dialog box 62 that permits the user to enter a username as shown at 64. The user may be prompted to enter the username upon the initial setup of the computer game environment, or alternatively, during the creation of a new game instance or upon the creation of a new profile for a user of the computer game environment. A user may also be permitted to change a username during an existing game. Furthermore, it will be appreciated that other manners of receiving a username for a user may be used in other embodiments. For example, a user may be permitted to create a user profile on a game console that is shared by multiple computer game environments.

Since the username is typically selected by a user with few restrictions placed upon what the user can enter (e.g., to prohibit duplicate usernames), this username may be suitable for use in determining a characteristic of a user that is helpful in advertisement selection. For example, some names are gender-specific, and indicate with a relative degree of probability the gender of the user that has selected the username. In addition, usernames are often chosen by users in honor of certain artistic works (e.g., movies, books, television programs, web sites, etc.) with which those users have an affinity. As such, the identification of characters or other references to a particular artistic work may be suitable for identifying an affinity between a user and a particular artistic work or even the genre with which the artistic work is associated. It will be appreciated that other types of information may be ascertained from a username, and as such, the username may be utilized to determine other characteristics of a user suitable for a use in selecting advertisements for that user. Of note, analysis of a username often can ascertain information about a user without requiring a direct query to the user (e.g., without requiring a user to specify his or her gender). In some instances, such analysis may render more accurate results, e.g., if a user purposely enters false personal information.

Figure 8:
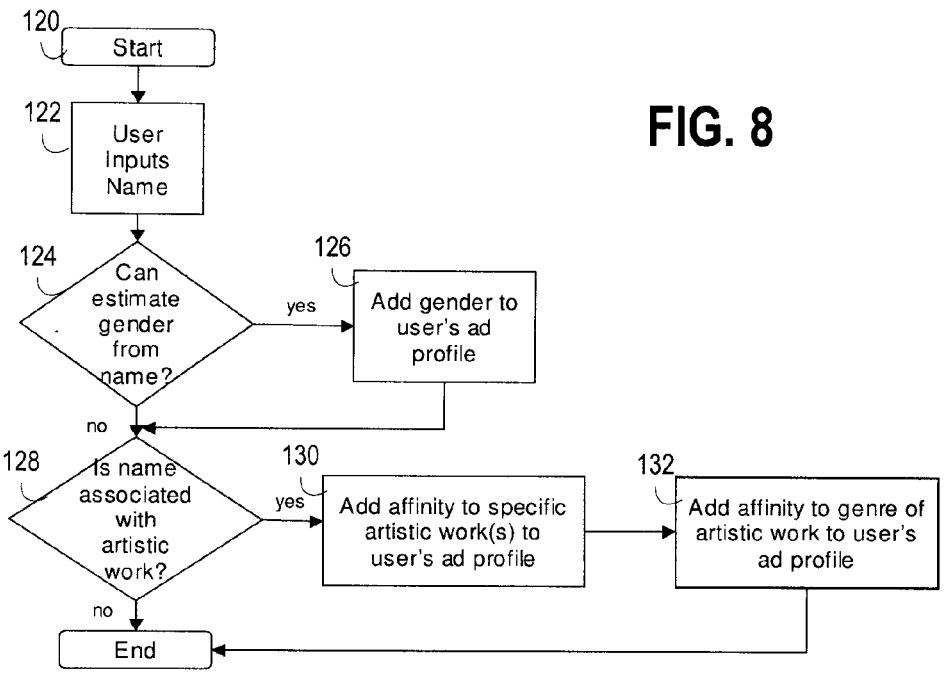
FIG. 8 is a flowchart illustrating the program flow of a username analysis routine capable of being executed by the advertisement selection service referenced in FIG. 1.

FIG. 8 illustrates a username analysis routine 120 capable of being executed by advertisement selection service 32 of FIG. 1. Routine 120 begins in block 122 by obtaining the username as input by a user. Block 124 then determines whether the gender can be estimated from the username. If so, control passes to block 126 to add the gender of the user to the user's ad profile. Control then passes to block 128 to determine whether the username is associated with a particular artistic work. Such an association may be based upon a reference to the artistic work, e.g., as to the name of the work, the name of a character or object in the work, the name of a location in the work, the name of an author or creator of a work, the name of a chapter in the work, etc. If the name is not associated with any particular artistic work, routine 120 is complete. Otherwise, if an association is detected, block 128 passes control to block 130 to add an affinity to the specific artistic work to the user's ad profile. In addition, block 132 may be executed to additionally add an affinity to the genre of the artistic work to the user's ad profile. Upon completion of block 132, routine 120 is complete.

It will be appreciated that routine 120 may be utilized in connection with a wide variety of artistic works, e.g., movies, books, television programs, web sites, etc. It will also be appreciated that various suitable text analysis techniques may be utilized to detect references to artistic works and/or gender affiliations within a username.

As an example of the operation of routine 120, FIG. 4 illustrates an entered username "ARAGORN99" at 64. From the detection of the term "ARAGORN" within the username, a number of characteristics may be determined. First, "ARAGORN" is commonly recognized as a character in the *Lord of the Rings* series by J. R. R. Tolkien. As such, based upon the username, the advertisement selection service may determine an affinity for the user with the *Lord of the Rings* books and movies, as well as the fantasy genre in general. In addition, given that "ARAGORN" is a male character, an estimation may also be made that the user is a male.

Figure 9:
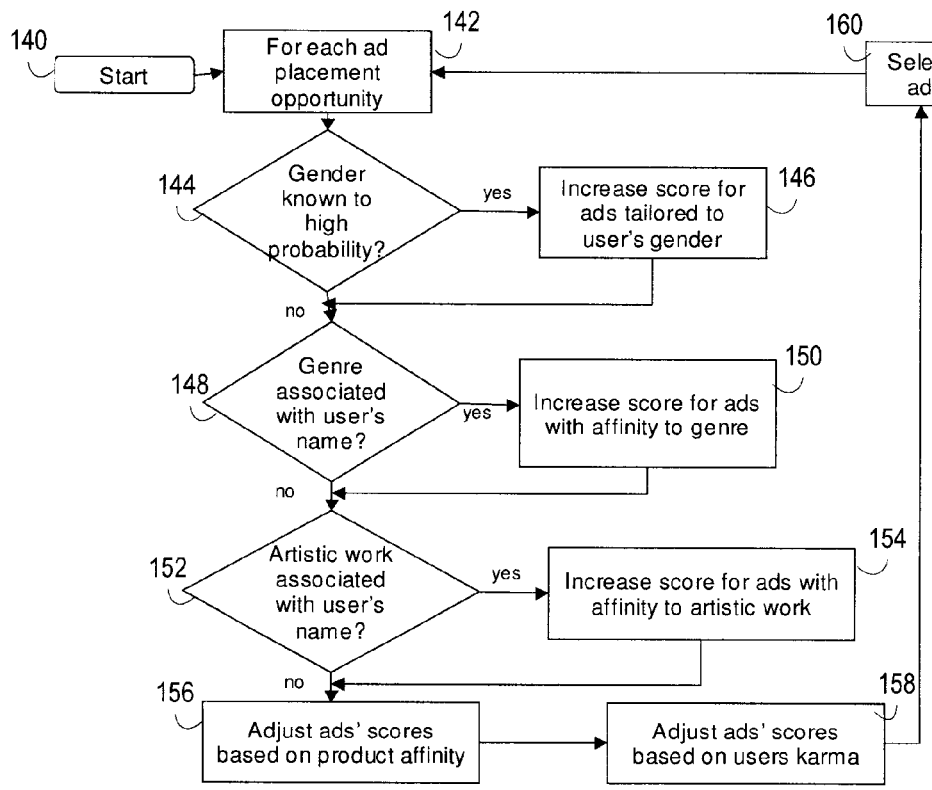
FIG. 9 is a flowchart illustrating the program flow of an advertisement selection routine capable of being executed by the advertisement selection service referenced in FIG. 1.

The creation of an ad profile for a user, as illustrated generally in connection with FIGS. 4-8, may be used by an advertisement selection service to select advertisements to be placed within a computer game environment. FIG. 9, for example illustrates an advertisement selection routine 140 capable of being executed by advertisement selection service 32. In this implementation, it is assumed that a set of advertisements is made available for a particular ad placement opportunity, or alternatively, for all ad placement opportunities in a computer game environment. For each ad placement opportunity, each advertisement is then scored at least in part upon the information collected in the routines illustrated in FIGS. 4-8. The score for each ad may be computed in a number of manners consistent with the invention, e.g., by scaling each type of information differently and computing a composite score. In addition, certain information in a user's profile may be used to eliminate particular advertisements completely from consideration, e.g., where a user interaction with an advertisement was "negative" in nature, it may be highly unlikely that the user would favorably receive future advertisements associated with the same product.

In addition, each advertisement will typically have its own profile established therefor, e.g, as input by an advertiser or other provider of the advertisements. The type of information stored in a profile for an advertisement will depend upon the types of information being monitored by the advertisement selection service. It is generally through the comparison of the profile of each advertisement and the ad profile of the user that the appropriateness of a particular advertisement for display to a particular user can be ascertained.

Routine 140 begins in block 142 by processing each ad placement opportunity. It will be appreciated that routine 140 may run continuously, e.g., to replace existing advertisements on a periodic basis, or to select new advertisements as a user progresses through a game and encounters new ad placement locations. In the alternative, routine 140 may be used to select an advertisement for each ad placement opportunity only once and terminate once all advertisements have been selected.

For each ad placement opportunity, block 142 passes control to block 144 to determine whether the gender of the user is known to a high probability, typically based upon the username of the user. If so, control passes to block 146 to increase the score for each advertisement tailored to the user's gender. Upon completion of block 146, or if the gender is not known in block 144, control passes to block 148 to determine whether a particular genre has been identified as being associated with the username. If so, control passes to block 150 to increase the score for any advertisements having affinity to the particular genre associated with the user's name. Upon completion of block 150, or if no genre is associated with the user's name, control passes to block 152 to determine whether a particular artistic work is associated with the username. If so, control passes to block 154 to increase the score for any advertisements having an affinity to the identified artistic work. Upon completion of block 154, or if no artistic work is identified, control passes to block 156 to adjust the score for each advertisement based upon a particular product or subject affinity. Put another way, the scores for advertisements directed to subjects with which a user has a high affinity will be increased, while the scores for the advertisements associated with subject for which a low user affinity has been established will be decreased.

Next, block 158 adjusts the advertisement scores based upon the user's "karma" or other personality trait. Put another way, advertisements that are established as being affiliated with users of a particular personality type may be scored higher or lower based upon the particular personality traits of the user at issue.

Upon completion of block 158, control then passes to block 160 to select an advertisement for the current placement opportunity. Selection of an advertisement may vary in different embodiments. For example, in one embodiment, the available advertisements may be sorted based upon their respective scores, with the top scoring advertisement being selected. In the alternative, block 160 may select the N highest scoring advertisements and then select from among those N advertisements based upon any number of suitable algorithms, e.g., round robin, random, etc. Additional factors may be used to determine what ad is selected, e.g., to ensure that advertisements are not repeated too frequently, to ensure that all advertising quotas are met, etc. Additional factors, e.g., parental controls, user location, user language, etc., may also play a part in selecting advertisements in connection with the information collected using the advertisement selection service described herein.

In addition, it will be appreciated that in other implementations, the scores of advertisements need not be re-computed for each ad placement opportunity. For example, it may be desirable to periodically update the scores for advertisements based upon changes to the ad profile for a given user, but to otherwise select future advertisements based upon previously-computed scores.

Various modifications may be made to the illustrated embodiments without departing from the spirit and scope of the invention. For example, the implementation described above in connection with FIGS. 4-9 utilizes information gathered from monitored behavior of a user, monitored user interaction with an advertisement, and monitored message traffic, along with analysis of a username. It will be appreciated, however, that each of these techniques may be used independently from one another in other implementations.

It will also be appreciated that an advertisement selection service consistent with the invention may be provided as an add-on service to computer game developers and publishers, and managed by an entity other than that which develops or publishes a computer game environment, and/or other than that which provides online gaming functionality in connection with a computer game environment. In particular, user ad profiles may be maintained and updated at a central location and used in the selection of advertisements in multiple computer game environments. In such an implementation, functionality within a computer game environment may upload monitored activities of a user to a remote service to enable the remote service to process the activities and update the user's ad profile, with additional functionality in the computer game environment used to download the user's ad profile and/or one or more advertisements for display to the user, with the selection of appropriate advertisements performed either by the remote service or locally by the computer game environment.

Various additional modifications to the herein-described embodiments will be apparent to one of ordinary skill in the art having the benefit of the instant disclosure. Therefore, the invention lies in the claims hereinafter appended.

What is claimed is:

1. A computer-implemented method of generating an advertisement in a virtual world interactive computer game environment, the method comprising:

monitoring a behavior of a user participating in a virtual world interactive computer game environment using at least one hardware-implemented processor, wherein monitoring the behavior includes monitoring interaction of a user-controlled character within the virtual world interactive computer game environment;
determining a personality trait of the user from the monitored behavior; and
selecting an advertisement to display to the user in the virtual world interactive computer game environment based upon the determined personality trait of the user.

2. The method of claim 1, wherein monitoring the behavior of the user includes monitoring for at least one of ethical conduct, unethical conduct, passive conduct, aggressive conduct, friendly conduct, unfriendly conduct, serious conduct, unserious conduct, generous conduct, selfish conduct, respectful conduct, rude conduct, deceitful conduct, honest conduct, creative conduct, shy conduct, bold conduct, helpful conduct, curious conduct, or cooperative conduct.

3. The method of claim 1, wherein monitoring the behavior of the user includes monitoring interaction of the user with another user participating in the virtual world interactive computer game environment.

4. The method of claim 1, wherein monitoring the behavior of the user includes monitoring interaction of the user-controlled character with another character in the virtual world interactive computer game environment.

5. The method of claim 1, wherein monitoring the behavior of the user includes monitoring interaction of the user-controlled character with an object in the virtual world interactive computer game environment.

6. The method of claim 1, wherein monitoring the behavior of the user includes detecting a positive action undertaken by the user, wherein determining the personality trait includes increasing a personality score for the user based upon the detected positive action.

7. The method of claim 1, wherein monitoring the behavior of the user includes detecting a negative action undertaken by the user, wherein determining the personality trait includes decreasing a personality score for the user based upon the detected negative action.

8. An apparatus, comprising:
at least one processor; and
program code configured to be executed by the at least one processor to select an advertisement to be displayed to a user in a virtual world interactive computer game environment based upon a personality trait of the user determined from monitoring a behavior of the user as the user is participating in the virtual world interactive computer game environment, wherein the program code is configured to monitor the behavior of the user by monitoring interaction of a user-controlled character within the virtual world interactive computer game environment.

9. The apparatus of claim 8, wherein the program code is further configured to monitor the behavior of the user as the user is participating in the virtual world interactive computer game environment.

10. The apparatus of claim 8, wherein the program code is further configured to determine the personality trait of the user from the monitored behavior.

11. A program product, comprising:
program code configured to select an advertisement to be displayed to a user in a virtual world interactive computer game environment based upon a personality trait of the user determined from monitoring a behavior of the user as the user is participating in the virtual world interactive computer game environment, wherein the program code is configured to monitor the behavior of the user by monitoring interaction of a user-controlled character within the virtual world interactive computer game environment; and
a recordable medium bearing the program code.

12. A computer-implemented method of generating an advertisement in a virtual world interactive computer game environment, the method comprising providing an advertisement selection service that selects an advertisement to be displayed to a user in a virtual world interactive computer game environment based upon a personality trait of the user determined from monitoring a behavior of the user as the user is participating in the virtual world interactive computer game environment using at least one hardware-implemented processor, wherein the advertisement selection service is configured to monitor the behavior of the user by monitoring interaction of a user-controlled character within the virtual world interactive computer game environment.

13. A computer-implemented method of generating an advertisement in a virtual world interactive computer game environment, the method comprising:
monitoring activity of a user participating in a virtual world interactive computer game environment, including monitoring activity of the user after the user views an advertisement displayed within the virtual world interactive computer game environment using at least one hardware-implemented processor;
determining a personality trait of the user from the monitored behavior;
determining a user affinity for a subject of the advertisement based upon the monitored activity; and
selecting another advertisement to display to the user in the virtual world interactive computer game environment based upon the determined personality trait of the user and the determined user affinity.

14. The method of claim 13, wherein selecting the other advertisement includes selecting a different advertisement to be displayed in a same location in the virtual world interactive computer game environment as the advertisement viewed by the user.

15. The method of claim 13, wherein selecting the other advertisement includes selecting an advertisement to be displayed in a different location in the virtual world interactive computer game environment from the advertisement viewed by the user.

16. The method of claim 13, wherein monitoring the user activity includes monitoring for a message communicated from the user to another user of the virtual world interactive computer game environment that references the subject of the advertisement viewed by the user.

17. The method of claim 16, wherein the message includes a text message.

18. The method of claim 13, wherein monitoring the user activity includes monitoring interaction of a character controlled by the user with the advertisement within the virtual world interactive computer game environment.

19. The method of claim 18, wherein monitoring interaction of the character controlled by the user with the advertisement includes detecting a negative action directed to the advertisement by the user through the user-controlled character, wherein determining the user affinity includes determining a low user affinity for the subject of the advertisement, and wherein selecting another advertisement includes selecting an advertisement for a subject that is dissimilar to the subject of the advertisement viewed by the user based upon the determined low user affinity.

20. The method of claim 19, wherein selecting the advertisement for the subject that is dissimilar to the subject of the advertisement viewed by the user includes selecting an advertisement for a subject having at least one of a different brand and a different product category from that of the subject of the advertisement viewed by the user.

21. The method of claim 18, wherein monitoring interaction of the character controlled by the user with the advertisement includes detecting a positive action directed to the advertisement by the user through the user-controlled character, wherein determining the user affinity includes determining a high user affinity for the subject of the advertisement, and wherein selecting another advertisement includes selecting an advertisement for a subject that is similar to the subject of the advertisement viewed by the user based upon the determined high user affinity.

22. An apparatus, comprising:
   at least one processor; and
   program code configured to be executed by the at least one processor to select an advertisement to be displayed to a user in a virtual world interactive computer game environment based upon a personality trait of the user determined from monitoring a behavior of the user as the user is participating in the virtual world interactive computer game environment and based upon a user affinity for a subject of another advertisement determined from monitoring activity of the user after the user views the other advertisement while the other advertisement is displayed in the virtual world interactive computer game environment.

23. The apparatus of claim 22, wherein the program code is further configured to monitor the activity of the user after the user views the other advertisement.

24. The apparatus of claim 22, wherein the program code is further configured to determine the user affinity for the subject of the advertisement based upon the monitored activity.

25. A program product, comprising:
   program code configured to select an advertisement to be displayed to a user in a virtual world interactive computer game environment based upon a personality trait of the user determined from monitoring a behavior of the user as the user is participating in the virtual world interactive computer game environment and based upon a user affinity for a subject of another advertisement determined from monitoring activity of the user after the user views the other advertisement while the other advertisement is displayed in the virtual world interactive computer game environment; and
   a recordable medium bearing the program code.

26. A computer-implemented method of generating an advertisement in a virtual world interactive computer game environment, the method comprising providing an advertisement selection service that selects an advertisement to be displayed to a user in a virtual world interactive computer game environment based upon a personality trait of the user determined from monitoring a behavior of the user as the user is participating in the virtual world interactive computer game environment and based upon a user affinity for a subject of another advertisement determined from monitoring activity of the user after the user views the other advertisement while the other advertisement is displayed in the virtual world interactive computer game environment using at least one hardware-implemented processor.

27. A computer-implemented method of generating an advertisement in a virtual world interactive computer game environment, the method comprising:
   determining a characteristic of a user who interacts with a virtual world interactive computer game environment from a username selected by the user;
   monitoring a behavior of the user as the user is participating in the virtual world interactive computer game environment;
   determining a personality trait of the user from the monitored behavior; and
   selecting an advertisement to display to the user when interacting with the computer game environment based upon the determined personality trait of the user and the determined characteristic using at least one hardware-implemented processor.

28. The method of claim 27, wherein determining the characteristic includes:
   identifying at least a portion of a gender-affiliated name in the username; and
   determining a gender of the user based upon the identified gender-affiliated name.

29. The method of claim 27, wherein determining the characteristic includes identifying a reference to an artistic work from the username.

30. The method of claim 29, wherein the artistic work is selected from the group consisting of a movie, a book, a television program, or a web site.

31. The method of claim 29, wherein determining the characteristic includes determining a user affinity to the artistic work.

32. The method of claim 29, wherein determining the characteristic includes determining a user affinity to a genre associated with the artistic work.

33. An apparatus, comprising:
   at least one processor; and
   program code configured to be executed by the at least one processor to select an advertisement to be displayed to a user when the user is interacting with a virtual world interactive computer game environment based upon a personality trait of the user determined from monitoring a behavior of the user as the user is participating in the virtual world interactive computer game environment and based upon a characteristic of the user determined from a username selected by the user.

34. The apparatus of claim 33, wherein the program code is further configured to determine the characteristic of the user from the username selected by the user.

35. A program product, comprising:
   program code configured to select an advertisement to be displayed to a user when the user is interacting with a virtual world interactive computer game environment based upon a personality trait of the user determined from monitoring a behavior of the user as the user is participating in the virtual world interactive computer game environment and based upon a characteristic of the user determined from a username selected by the user; and
   a recordable medium bearing the program code.

36. A computer-implemented method of generating an advertisement in a virtual world interactive computer game environment, the method comprising providing an advertisement selection service that selects an advertisement to be displayed to a user when the user is interacting with the virtual world interactive computer game environment based upon a personality trait of the user determined from monitoring a behavior of the user as the user is participating in the virtual world interactive computer game environment and based upon a characteristic of the user determined from a username selected by the user using at least one hardware-implemented processor.

* * * * *